United States Patent
Yang et al.

(10) Patent No.: US 10,203,553 B2
(45) Date of Patent: Feb. 12, 2019

(54) BACKLIGHT MODULE, DRIVING METHOD THEREOF AND DISPLAY DEVICE

(71) Applicants: Boe Technology Group Co., Ltd., Beijing (CN); Beijing Boe Optoelectronics Technology Co., Ltd., Beijing (CN)

(72) Inventors: Shengji Yang, Beijing (CN); Xiaochuan Chen, Beijing (CN); Panhua Wang, Beijing (CN); Xue Dong, Beijing (CN); Hailin Xue, Beijing (CN); Haisheng Wang, Beijing (CN); Weijie Zhao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 69 days.

(21) Appl. No.: 15/198,919

(22) Filed: Jun. 30, 2016

(65) Prior Publication Data

US 2017/0102589 A1 Apr. 13, 2017

(30) Foreign Application Priority Data

Oct. 10, 2015 (CN) .......................... 2015 1 0654373

(51) Int. Cl.
*G09G 3/34* (2006.01)
*G02F 1/1335* (2006.01)
(Continued)

(52) U.S. Cl.
CPC ..... *G02F 1/133621* (2013.01); *G09G 3/2003* (2013.01); *G09G 3/3413* (2013.01);
(Continued)

(58) Field of Classification Search
CPC .. G02F 1/133621; G02F 2001/133622; G09G 3/3677; G09G 3/2003; G09G 3/3413;
(Continued)

(56) References Cited

U.S. PATENT DOCUMENTS

| 6,867,757 B1 | 3/2005 | Nakamura |
| 2005/0058450 A1* | 3/2005 | Yamamoto ................ G01J 1/32 398/25 |

(Continued)

FOREIGN PATENT DOCUMENTS

| CN | 1265506 A | 9/2000 |
| CN | 101083067 A | 12/2007 |
| CN | 101165765 A | 4/2008 |

OTHER PUBLICATIONS

First Office Action for Chinese Patent Application No. 201510654373.5 dated Sep. 29, 2017.

(Continued)

*Primary Examiner* — Srilakshmi K Kumar
*Assistant Examiner* — Chineyere D Wills-Burns
(74) *Attorney, Agent, or Firm* — Calfee, Halter & Griswold LLP (57) ABSTRACT

Disclosed is a backlight module which includes a plurality of light-emitting devices arranged in an array of multiple rows and multiple columns. Each row of light-emitting devices include a plurality of first light-emitting devices for emitting red light, a plurality of second light-emitting devices for emitting green light and a plurality of third light-emitting devices for emitting blue light. The first light-emitting device, the second light-emitting devices and the third light-emitting devices in each row of light-emitting devices are driven to sequentially emit light based on respective data signals in a light-emitting phase. Further disclosed are a method of driving the backlight module and a display device.

13 Claims, 8 Drawing Sheets

(51) Int. Cl.
*G09G 3/20* (2006.01)
*G09G 3/36* (2006.01)

(52) U.S. Cl.
CPC ......... *G09G 3/3426* (2013.01); *G09G 3/3677* (2013.01); *G09G 3/3688* (2013.01); *G02F 2001/133622* (2013.01); *G09G 2310/0235* (2013.01); *G09G 2310/0251* (2013.01); *G09G 2310/08* (2013.01); *G09G 2320/064* (2013.01)

(58) Field of Classification Search
CPC ............... G09G 3/3426; G09G 3/3688; G09G 2310/0235; G09G 2310/0251; G09G 2310/08; G09G 2320/064
USPC ........................................................ 345/691
See application file for complete search history.

(56) References Cited

U.S. PATENT DOCUMENTS

| | | | |
|---|---|---|---|
| 2006/0022900 A1* | 2/2006 | Miyake | G09G 3/3233 345/55 |
| 2007/0262948 A1* | 11/2007 | Han | G09G 3/3406 345/102 |
| 2007/0279374 A1 | 12/2007 | Kimura et al. | |
| 2008/0150880 A1 | 6/2008 | Inuzuka et al. | |
| 2009/0303412 A1* | 12/2009 | Ake | G09G 3/3426 349/61 |
| 2010/0085335 A1* | 4/2010 | Kato | G09G 3/3677 345/204 |
| 2010/0164847 A1* | 7/2010 | Lee | G09G 3/3233 345/77 |
| 2012/0050234 A1* | 3/2012 | Jang | G09G 3/3225 345/204 |
| 2012/0133290 A1 | 5/2012 | Hasegawa | |
| 2012/0188290 A1* | 7/2012 | Park | G09G 3/3266 345/690 |
| 2012/0306843 A1* | 12/2012 | Wang | G09G 3/3258 345/212 |
| 2016/0286614 A1* | 9/2016 | Xu | H05B 33/0815 |

OTHER PUBLICATIONS

Second Office Action for Chinese Patent Application No. 201510654373.5 dated Jun. 22, 2018.

* cited by examiner

BACKLIGHT MODULE, DRIVING METHOD THEREOF AND DISPLAY DEVICE

CROSS-REFERENCE TO THE RELATED APPLICATIONS

The present application claims the benefit of Chinese Patent Application No. 201510654373.5, filed on Oct. 10, 2015, the entire disclosure of which is incorporated herein by reference.

TECHNICAL FIELD

The present disclosure relates to the field of display technology, and particularly to a backlight module, a driving method thereof and a display device.

BACKGROUND

Field Sequential Color (FSC) display technology is initially applied in the projector system where three color fields of R, G, and B are switched at a certain frequency to blend into a complete color picture. In such a system, the switching of the color fields is achieved through the rotation of a color wheel.

For a liquid crystal display, the switching of the color fields requires a change in the color of its backlight. Backlight modules using light-emitting diodes (LEDs) have been proposed that may be used in combination with the Field Sequential Color display technology.

Although such backlight modules may provide a high operation performance, there is still a need for a backlight module with improved functionality.

SUMMARY

Embodiments of the present disclosure provide a backlight module which may provide backlight for a liquid crystal display that utilizes the field sequential color technology.

According to an aspect of the present disclosure, a backlight module is provided comprising: a plurality of light-emitting devices arranged in an array of multiple rows and multiple columns, each row comprising a plurality of first light-emitting devices for emitting red light, a plurality of second light-emitting devices for emitting green light and a plurality of third light-emitting devices for emitting blue light; a plurality of driving modules each configured to drive a respective one of the plurality of light-emitting devices to emit light based on a respective data signal; and a plurality of light-emitting control modules each associated with respective ones of the driving modules for driving a respective row of the light-emitting devices and configured to control the respective driving modules to drive the first light-emitting devices, the second light-emitting devices and the third light-emitting devices in the respective row of the light-emitting devices to emit light sequentially based on respective data signals in a light-emitting phase.

In some embodiments, each of the light-emitting control modules comprises: a first switching transistor having a gate connected with a first control signal line, a source connected with a primary light-emitting control line, and a drain connected with a first secondary light-emitting control line, the first secondary light-emitting control line being connected to the driving modules for driving the first light-emitting devices in the respective row of the light-emitting devices; a second switching transistor having a gate connected with a second control signal line, a source connected with the primary light-emitting control line, and a drain connected with the second secondary light-emitting control line, the second secondary light-emitting control line being connected to the driving modules for driving the second light-emitting devices in the respective row of the light-emitting devices; and a third switching transistor having a gate connected with a third control signal line, a source connected with the primary light-emitting control line and a drain connected with a third secondary light-emitting control line, the third secondary light-emitting control line being connected to the driving modules for driving the third light-emitting devices in the respective row of the light-emitting devices. The first switching transistor, the second switching transistor and the third switching transistor are configured to, in response to control signals from the first control signal line, the second control signal line and third control signal line, alternatingly turn on in the light-emitting phase, to sequentially apply a light-emitting control signal from the primary light-emitting control line to the first secondary light-emitting control line, the second secondary light-emitting control line and the third secondary light-emitting control line.

In some embodiments, the first switching transistor, the second switching transistor and the third switching transistor are configured to, in response to the control signals from the first control signal line, the second control signal line and the third control signal line, turn off in a time period other than the light-emitting phase.

In some embodiments, each of the driving modules comprises a resetting unit, a charging unit, a compensating unit, a maintaining unit, a power supply input unit, a driving unit, and a controlling unit. The resetting unit is configured to, in response to a reset scan signal from a reset scan line, initialize a voltage at a first node to a reset voltage. The charging unit is configured to, in response to a gate scan signal from a gate scan line, transfer a data signal from a data line to a second node. The data signal is further transferred to a third node via the driving unit. The compensating unit is configured to, in response to the gate scan signal from the gate scan line, provide a conduction path from the third node to the first node such that the data signal charges the first node. The maintaining unit is configured to maintain a charged voltage derived from the charging of the first node by the data signal. The power supply input unit is configured to, in response to the light-emitting control signal from one of the first secondary light-emitting control line, the second secondary light-emitting control line and the third secondary light-emitting control line, provide a power supply voltage for the driving unit. The driving unit is configured to, in response to the charged voltage at the first node and the power supply voltage, provide a driving current flowing from the second node to the third node. The controlling unit is configured to, in response to the light-emitting control signal from one of the first secondary light-emitting control line, the second secondary light-emitting control line and the third secondary light-emitting control line, direct the driving current to the respective light-emitting device.

In some embodiments, the driving unit comprises a driving transistor having a gate connected with the first node, a source connected with the second node, and a drain connected with the third node.

In some embodiments, the resetting unit comprises a fourth switching transistor having a gate connected with the reset scan line, a source connected with the reset voltage, and a drain connected with the first node.

In some embodiments, the compensating unit comprises a fifth switching transistor having a gate connected with the gate scan line, a source connected with the first node, and a drain connected with the third node.

In some embodiments, the charging unit comprises a sixth switching transistor having a gate connected with the gate scan line, a source connected with the data line, and a drain connected with the second node.

In some embodiments, the maintaining unit comprises a storage capacitor having a terminal connected to the first node and another terminal connected to the power supply voltage.

In some embodiments, the power supply input unit comprises a seventh switching transistor having a gate connected with one of the first secondary light-emitting control line, the second secondary light-emitting control line and the third secondary light-emitting control line, a source connected with the power supply voltage, and a drain connected with the second node.

In some embodiments, the controlling unit comprises an eighth switching transistor having a gate connected with one of the first secondary light-emitting control line, the second secondary light-emitting control line and the third secondary light-emitting control line, a source connected with the third node, and a drain connected with the respective light-emitting device.

In some embodiments, the backlight module further comprises: a first scan driving unit configured to provide scan signals to scan lines, each of the scan lines being connected to respective ones of the driving modules for driving a respective row of the light-emitting devices; a second scan driving unit configured to provide respective light-emitting control signals to the plurality of light-emitting control modules; and a data driving unit configured to provide data signals to data lines, each of the data lines being connected to respective ones of the driving modules for driving a respective column of the light-emitting devices.

In some embodiments, the plurality of light-emitting devices are organic light-emitting diodes (OLEDs).

According to another aspect of the present disclosure, a display device is provided comprising a liquid crystal display panel and the above-mentioned backlight module for providing backlight for the liquid crystal display panel.

According to a further aspect of the present disclosure, a method of driving the above-mentioned backlight module is provided comprising:

driving the plurality of first light-emitting devices in each row of the light-emitting devices to emit light within a first time period of a respective light-emitting phase for each row of the light-emitting devices;

driving the plurality of second light-emitting devices in each row of the light-emitting devices to emit light within a second time period of the respective light-emitting phase for each row of the light-emitting devices; and driving the plurality of third light-emitting devices in each row of the light-emitting devices to emit light within a third time period of the respective light-emitting phase for each row of the light-emitting devices.

These and other aspects of the present disclosure will be made apparent from and elucidated with reference to the embodiments described hereinafter.

BRIEF DESCRIPTION OF THE DRAWINGS

FIG. 3b is a time sequence diagram of the light-emitting control module of FIG. 3a;

FIG. 5b is a time sequence diagram of the light-emitting unit of FIG. 5a;

DETAILED DESCRIPTION

Embodiments of the present disclosure will be described below in detail with reference to the drawings.

Figure 1:
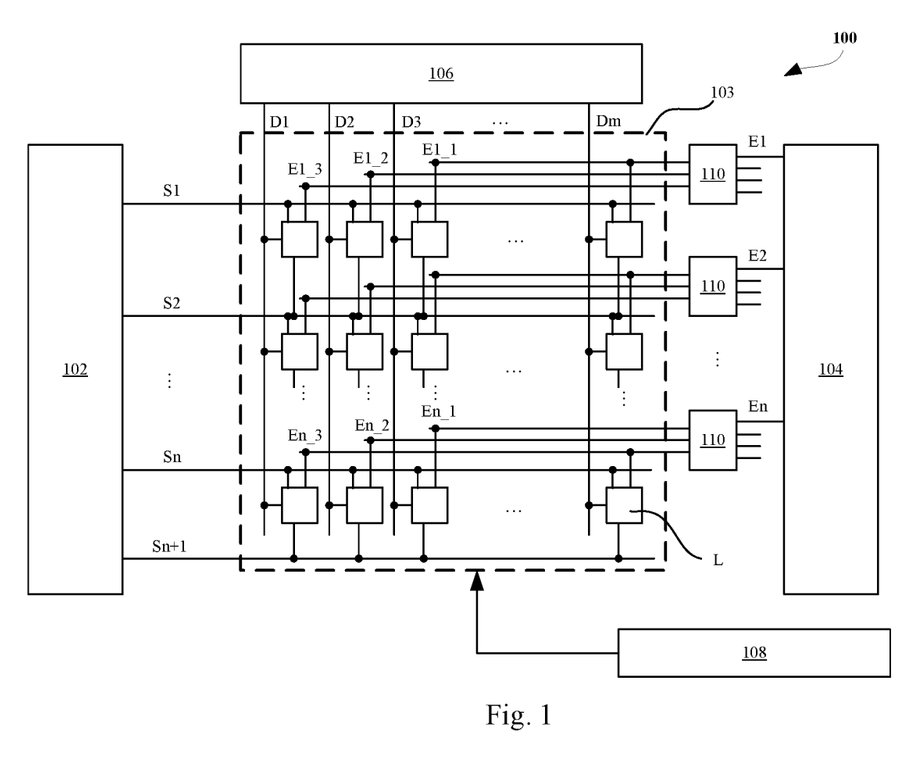
FIG. 1 is a block diagram of a backlight module according to an embodiment of the present disclosure.

FIG. 1 is a block diagram of a backlight module 100 according to an embodiment of the present disclosure. Referring to FIG. 1, the backlight module 100 comprises a light-emitting unit array 103, a first scan driving unit 102, a second scan driving unit 104, a data driving unit 106, a power supply driving unit 108 and a plurality of light-emitting control modules 110.

The light-emitting unit array 103 comprises n×m light-emitting units L. Each light-emitting unit L comprises a light-emitting device (e.g., an OLED) and a driving module (not shown). The light-emitting unit array 103 comprises n+1 scan lines S1, S2, . . . , Sn+1 that are arranged in a row direction to transfer scan signals, m data lines D1, D2, . . . , Dm that are arranged in a column direction to transfer data signals, $3n$ light-emitting control lines E1_1, E1_2, E1_3 . . . , En_1, En_2, En_3 that are arranged in a row direction to transfer light-emitting control signals, and m first power lines (not shown) and m second power lines (not shown) that are used to apply a first and a second power supply voltages VDD and VSS. n and m are natural numbers. The light-emitting unit array 103 causes the light-emitting devices (not shown) to emit light by using the scanning signals, the data signals, the light-emitting control signals, the first power supply voltage VDD, and the second power supply voltage VSS.

The first scan driving unit 102 is connected to the scan lines S1, S2, . . . , Sn+1 to apply the scanning signals to the light-emitting unit array 103.

The second scan driving unit 104 is connected to the light-emitting control lines E1, E2, . . . , En to apply the light-emitting control signals to respective light-emitting control modules 110.

The data driving unit 106 is connected to the data lines D1, D2, . . . , Dm to apply the data signals to the light-emitting unit array 103.

The power supply driving unit 108 applies the first power supply voltage VDD and the second power supply voltage VSS to each light-emitting unit L in the light-emitting unit array 103.

Each light-emitting control module 110 is associated with a respective row of the plurality of rows of light-emitting units L, and controls, through the light-emitting control lines Ek_1, Ek_2 and Ek_3 (k=1, 2, . . . , n), first light-emitting devices for emitting red light, second light-emitting devices for emitting green light and third light-emitting devices for emitting blue light in the respective row of light-emitting devices to emit light sequentially in a light-emitting phase.

As such, the backlight module 100 may sequentially provide red backlight, green backlight and blue backlight in a frame period, thereby meeting the requirements of the liquid crystal displays that employ the Field Sequential Color (FSC) technology.

The backlight module 100 may be considered a separate display panel where each light-emitting unit L constitutes a pixel based on a light-emitting device (e.g., an OLED). A difference between this display panel and an ordinary OLED display panel lies in that it is provided with the light-emitting control modules 110. Based on the light-emitting control signals from respective light-emitting control lines E1, E2, . . . , En, the light-emitting control modules 110 output respective light-emitting control signals to control the first light-emitting devices, the second light-emitting devices and the third light-emitting devices to emit light sequentially in the light-emitting phase.

Figure 2:
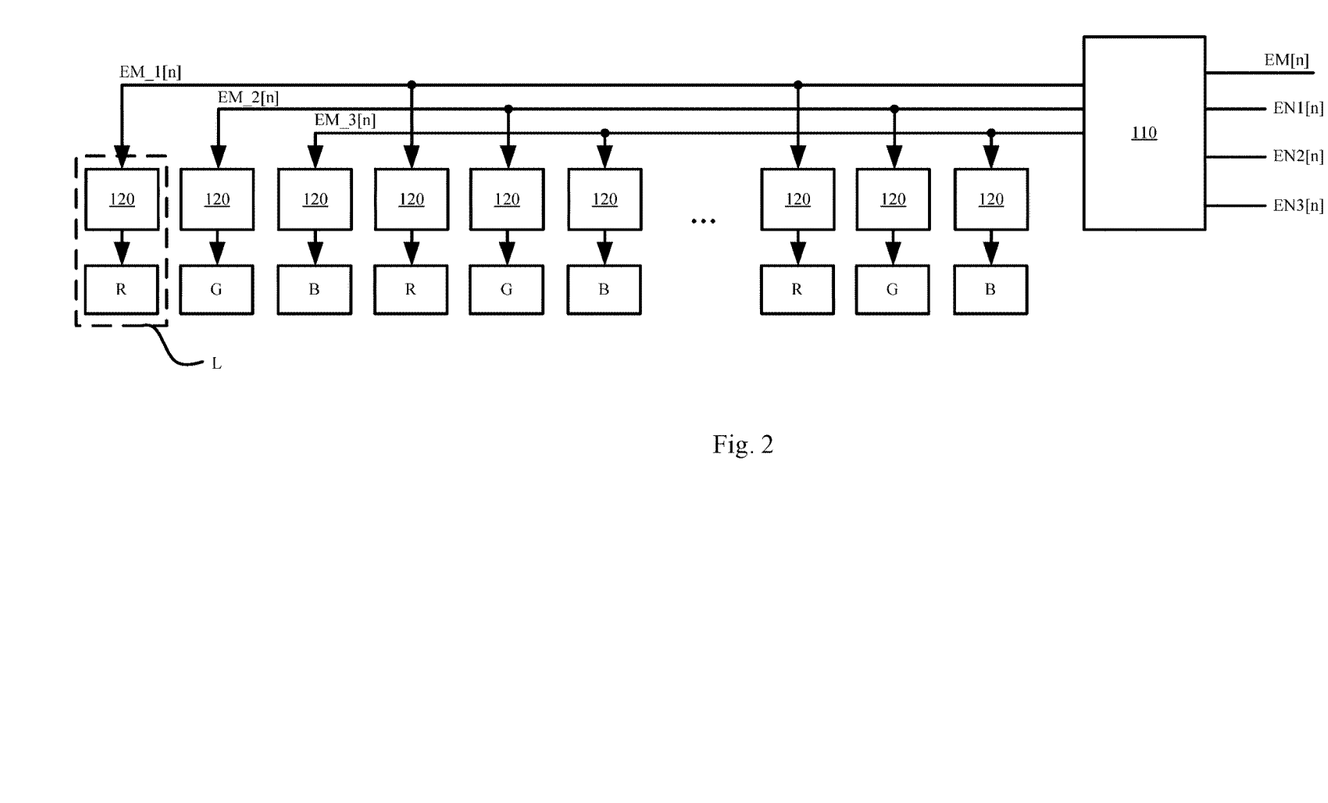
FIG. 2 is a block diagram showing a light-emitting control module and a corresponding row of light-emitting units in the backlight module of FIG. 1.

FIG. 2 is a block diagram showing a light-emitting control module 110 and a corresponding row of light-emitting units L in the backlight module 100 of FIG. 1. For ease of description, FIG. 2 shows a light-emitting control module 110 and a corresponding row of light-emitting units L that are connected to the n-th light-emitting control line EM[n], and does not show the connections between the light-emitting units L and other units of the backlight module 100.

Each light-emitting unit L comprises a light-emitting device and a driving module 120 for driving the light-emitting device to emit light. Each row of light-emitting devices comprises a plurality of first light-emitting devices R for emitting red light, a plurality of second light-emitting devices G for emitting green light and a plurality of third light-emitting devices B for emitting blue light. The driving modules 120 for driving the first light-emitting devices R are connected to a first secondary light-emitting control line EM_1[n], the driving modules 120 for driving the second light-emitting devices G are connected to a second secondary light-emitting control line EM_2[n], and the driving modules 120 for driving the third light-emitting devices B are connected to a third secondary light-emitting control line EM_3[n]. It will be appreciated that arrangement of light-emitting devices R, G and B as shown in FIG. 2 is exemplary. In other embodiments, the light-emitting devices R, G and B may have other arrangement patterns.

The light-emitting control module 110 is connected to a primary light-emitting control line EM[n], through which a primary light-emitting control signal is received from the second scan driving unit 104 of FIG. 1. The light-emitting control module 110 is further connected to a first control signal line EN1[n], a second control signal line EN2[n] and a third control signal line EN3[n] to receive a first control signal, a second control signal and a third control signal, respectively. The light-emitting control module 110 is further connected to the first secondary light-emitting control line EM_1[n], the second secondary light-emitting control line EM_2[n] and the third secondary light-emitting control line EM_3[n]. In response to the first control signal, the second control signal and the third control signal, the light-emitting control module 110 selectively applies the primary light-emitting control signal to the first secondary light-emitting control line EM_1[n], the second secondary light-emitting control line EM_2[n] and the third secondary light-emitting control line EM_3[n] so that the first light-emitting devices R emit red light in a first time period, the second light-emitting devices G emit green light in a second time period, and the third light-emitting devices B emit blue light in a third time period.

Figure 3A:
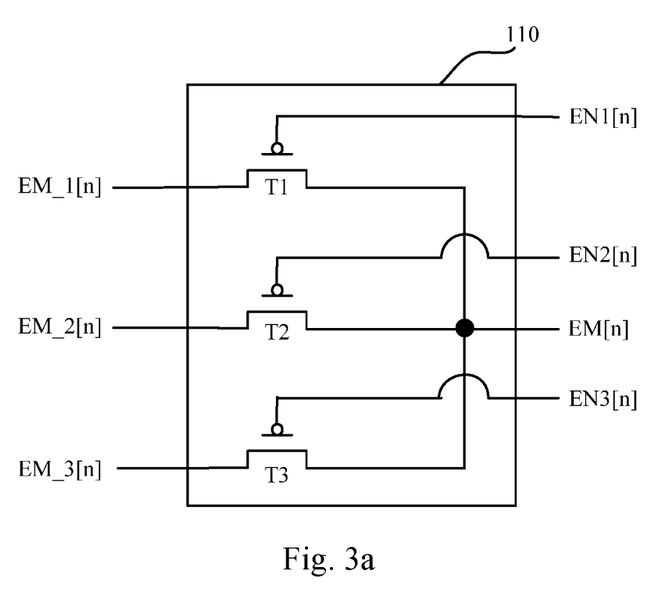
FIG. 3a is a schematic circuit diagram of the light-emitting control module of FIG. 2.

FIG. 3a is a schematic circuit diagram of the light-emitting control module 110 of FIG. 2. Referring to FIG. 3a, the light-emitting control module 110 comprises a first switching transistor T1, a second switching transistor T2 and a third switching transistor T3.

The first switching transistor T1 has a gate connected with the first control signal line EN1[n], a source connected with the primary light-emitting control line EM[n], and a drain connected with the first secondary light-emitting control line EM_1[n]. The second switching transistor T2 has a gate connected with the second control signal line EN2[n], a source connected with the primary light-emitting control line EM[n], and a drain connected with the second secondary light-emitting control line EM_2[n]. The third switching transistor T3 has a gate connected with the third control signal line EN3[n], a source connected with the primary light-emitting control line EM[n], and a drain connected with the third secondary light-emitting control line EM_3[n].

By virtue of the first switching transistor T1, the second switching transistor T2 and the third switching transistor T3, the light-emitting control module 110 may selectively apply the primary light-emitting control signal transferred on the primary light-emitting control line EM[n] to the first secondary light-emitting control line EM_1[n], the second secondary light-emitting control line EM_2[n] and the third secondary light-emitting control line EM_3[n].

Figure 3B:
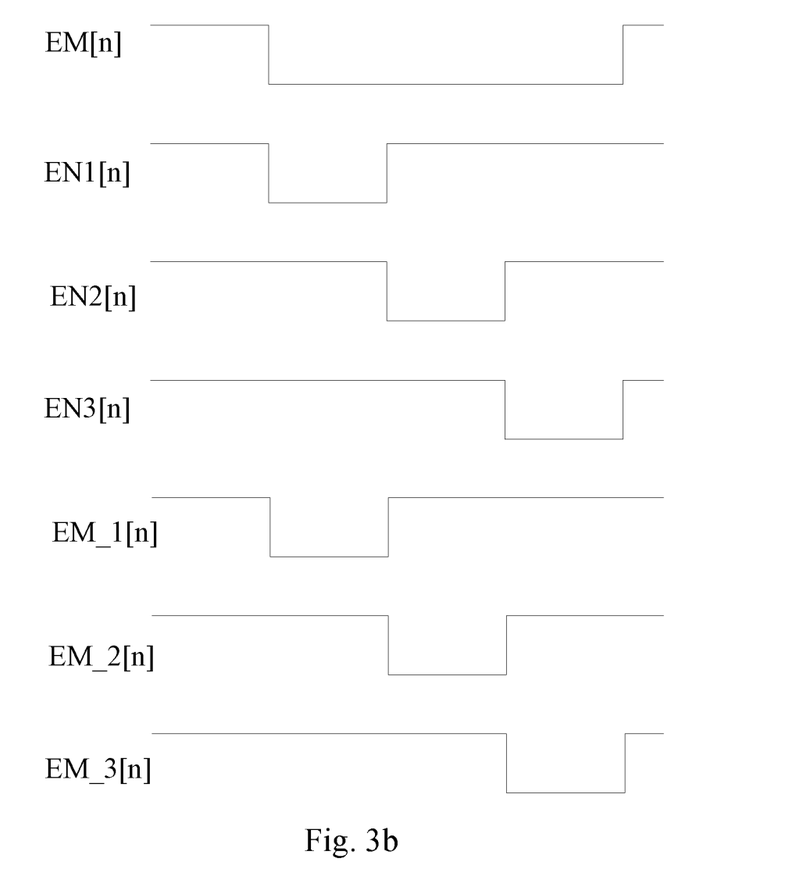

FIG. 3b is a time sequence diagram of the light-emitting control module 110 of FIG. 3a.

In a phase when the primary light-emitting control line EM[n] is at a high level, the first control signal line EN1[n], the second control signal line EN2[n] and the third control signal line EN3[n] are at a high level so that the first switching transistor T1, the second switching transistor T2 and the third switching transistor T3 in FIG. 3a are turned off. The first secondary light-emitting control line EM_1[n], the second secondary light-emitting control line EM_2[n] and the third secondary light-emitting control line EM_3[n] are at a default level (e.g., a high level).

As will be described below in detail, in this phase, the row of light-emitting units L associated with the light-emitting control module 110 are initialized, and the light-emitting units are written with respective data signals. Specifically, the data signals for the first light-emitting devices R, the data signals for the second light-emitting devices G and the data signals for the third light-emitting devices B are written into corresponding driving modules of the row of light-emitting units L, respectively.

In a phase when the primary light-emitting control line EM[n] is at a low level, levels on the first control signal line EN1[n], the second control signal line EN2[n] and the third control signal line EN3[n] are alternatingly pulled down so that the first switching transistor T1, the second switching transistor T2 and the third switching transistor T3 in FIG. 3a are alternatingly turned on. Therefore, the low level on the primary light-emitting control line EM[n] is sequentially applied to the first secondary light-emitting control line EM_1[n], the second secondary light-emitting control line EM_2[n] and the third secondary light-emitting control line EM_3[n].

As will be described below in detail, in this phase, the first light-emitting devices R, the second light-emitting devices G and the third light-emitting devices B that are associated with the light-emitting control module 110 emit light sequentially. Specifically, in response to the first secondary light-emitting control line EM_1[n] being at a low level, the first light-emitting devices R emit light. In response to the second secondary light-emitting control line EM_2[n] being at a low level, the second light-emitting devices G emit light. In response to the third secondary light-emitting control line EM_3[n] being at a low level, the third light-emitting devices B emit light.

Since the data signals for the second light-emitting devices G and the third light-emitting devices B have been pre-written into corresponding driving modules in the phase when the primary light-emitting control line EM[n] is at the high level, data write operations need not be performed for the second light-emitting devices G and the third light-emitting devices B in the current phase. This facilitates reduction of power consumption of the backlight module.

Figure 4:
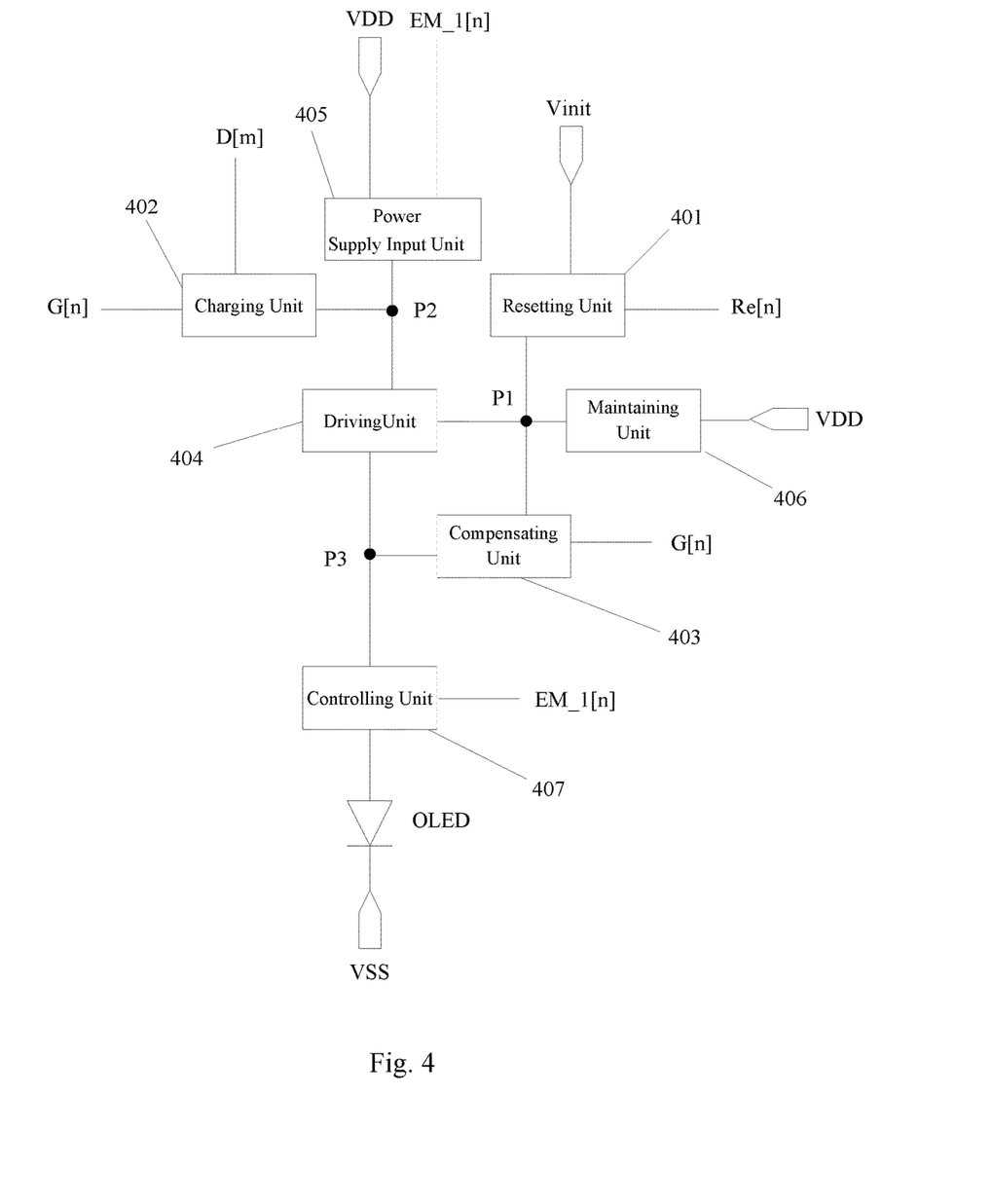
FIG. 4 is a block diagram of a light-emitting unit in the backlight module of FIG. 1.

FIG. 4 is a block diagram of a light-emitting unit in the backlight module 100 of FIG. 1. For ease of description, FIG. 4 shows a light-emitting unit connected to the n-th first secondary light-emitting control line EM_1[n], the m-th data line D[m], a reset scan line Re[n] (which corresponds to Sn in FIG. 1) and a gate scan line G[n] (which corresponds to Sn+1 in FIG. 1). In this example, the light-emitting unit comprises a driving module and a light-emitting device for emitting red light, and the light-emitting device is shown as an OLED.

The driving module comprises a resetting unit 401, a charging unit 402, a compensating unit 403, a driving unit 404, a power supply input unit 405, a maintaining unit 406 and a control unit 407.

The resetting unit 401 has a control terminal connected with the reset scan line Re[n], an input terminal connected with a reset voltage Vinit, and an output terminal connected with the first node P1. The resetting unit 401 is configured to, in response to a reset scan signal from the reset scan line Re[n], initialize a voltage at a first node P1 to a reset voltage.

The charging unit 402 has a control terminal connected with the gate scan line G[n], an input terminal connected with the data line D[m], and an output terminal connected with the second node P2. The charging unit 402 is configured to, in response to the gate scan signal from the gate scan line G[n], transfer a data signal from the data line D[m] a second node P2. The data signal is further transferred via the driving unit 404 to a third node P3.

The compensating unit 403 has a control terminal connected with the gate scan line G[n], an input terminal connected with the first node P1, and an output terminal connected with the third node P3. The compensating unit 403 is configured to, in response to a gate scan signal from the gate scan line G[n], provide a conduction path from the third node P3 to the first node P1 such that the data signal charges the first node P1.

The maintaining unit 406 has an input terminal connected with a first power supply voltage VDD, and an output terminal connected with the first node P1. The maintaining unit 406 is configured to maintain a charged voltage derived from the charging of the first node P1 by the data signal.

The power supply input unit 405 has a control terminal connected with the first secondary light-emitting control line EM_1[n], an input terminal connected with the first power supply voltage VDD, and an output terminal connected with the second node P2. The power supply input unit 405 is configured to, in response to the light-emitting control signal from the first secondary light-emitting control line EM_1[n], provide the first power supply voltage VDD for the driving unit 404.

The driving unit 404 has a control terminal connected with a first node P1, an input terminal connected with a second node P2, and an output terminal connected with a third node P3. The driving unit 404 is configured to, in response to the charged voltage at the first node P1 and the power supply voltage VDD, provide a driving current flowing from the second node P2 to the third node P3.

The controlling unit 407 has a control terminal connected with the first secondary light-emitting control line EM_1[n], an input terminal connected with the third node P3, and an output terminal connected with the light-emitting device OLED. The controlling unit 407 is configured to, in response to the light-emitting control signal from the first secondary light-emitting control line EM_1[n], direct the driving current to the light-emitting device OLED.

The light-emitting device OLED has an anode (not shown) connected to the output terminal of the controlling unit 407 and a cathode (not shown) connected to the second power supply voltage VSS. In response to the driving current directed by the controlling unit 407, the light-emitting device OLED emits light.

In the example shown in FIG. 4 a light-emitting unit is illustrated that is connected to the first secondary light-emitting control line EM_1 [n]. It will be appreciated that the light-emitting units connected to the second secondary light-emitting control line EM_2[n] and the third secondary light-emitting control line EM_3[n] have the same structure as the light-emitting unit shown in FIG. 4, except that the light-emitting devices therein are designed to emit green light and blue light respectively.

Figure 5A:
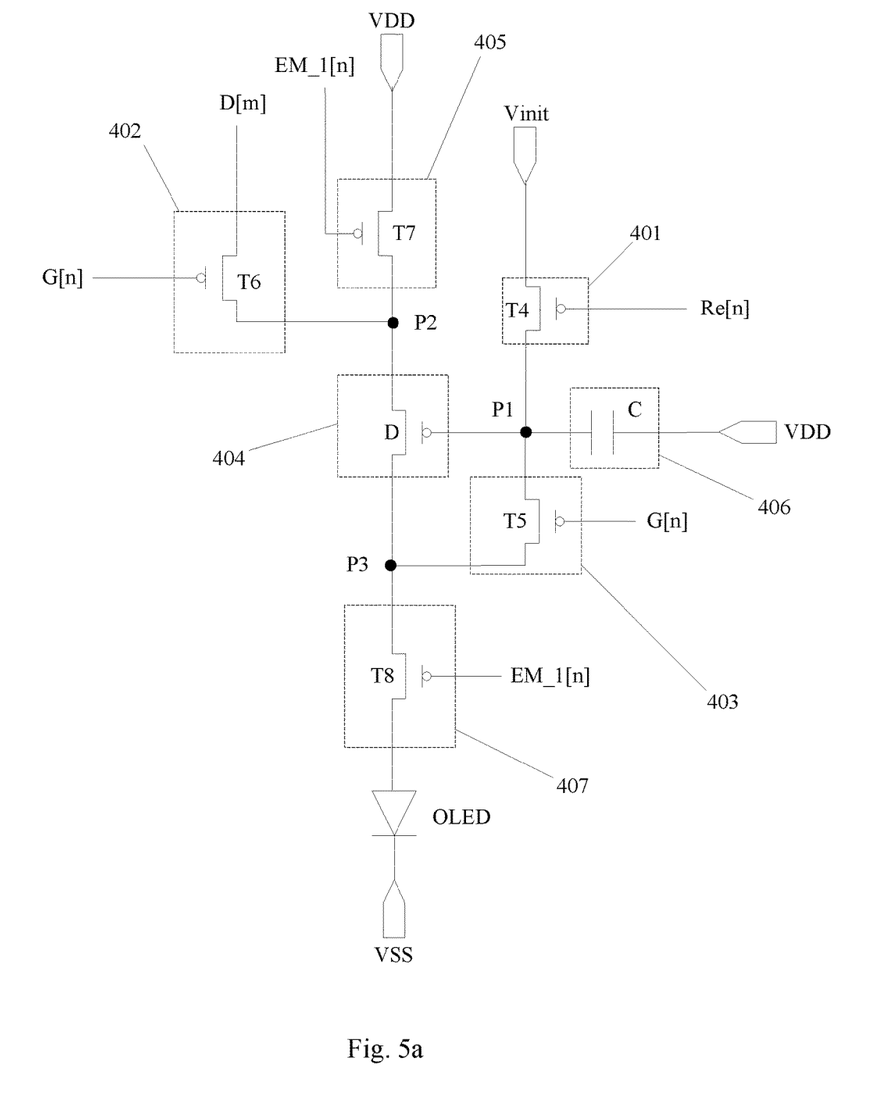
FIG. 5a is a schematic circuit diagram of the light-emitting unit of FIG. 4.

FIG. 5a is a schematic circuit diagram of the light-emitting unit of FIG. 4.

Referring to FIG. 5a, the driving unit 404 comprises a driving transistor D. The driving transistor D1 has a gate connected with the first node P1, a source connected with the second node P2, and a drain connected with the third node P3.

The resetting unit 401 comprises a fourth switching transistor T4. The fourth switching transistor T4 has a gate connected with the reset scan line Re[n], a source connected with the reset voltage Vinit, and a drain connected with the first node P1.

The compensating unit 403 comprises a fifth switching transistor T5. The Fifth switching transistor T5 has a gate connected with the gate scan line G[n], a source connected with the first node P1, and a drain connected with the third node P3.

The charging unit 402 comprises a sixth switching transistor T6. The sixth switching transistor T6 has a gate connected with the gate scan line G[n], a source connected with the data line D[m], and a drain connected with the second node P2.

The maintaining unit 406 comprises a storage capacitor C. The storage capacitor C has a terminal connected to the first node P1 and another terminal connected to the first power supply voltage VDD.

The power supply input unit 405 comprises a seventh switching transistor T7. The seventh switching transistor T7 has a gate connected with the first secondary light-emitting control line EM_1[n], a source connected with the first power supply voltage VDD, and a drain connected with the second node P2.

The controlling unit 407 comprises an eighth switching transistor T8. The eighth switching transistor T8 has a gate connected with the first secondary light-emitting control line EM_1[n], a source connected with the third node P3, and a drain connected with the light-emitting device OLED.

Figure 5B:
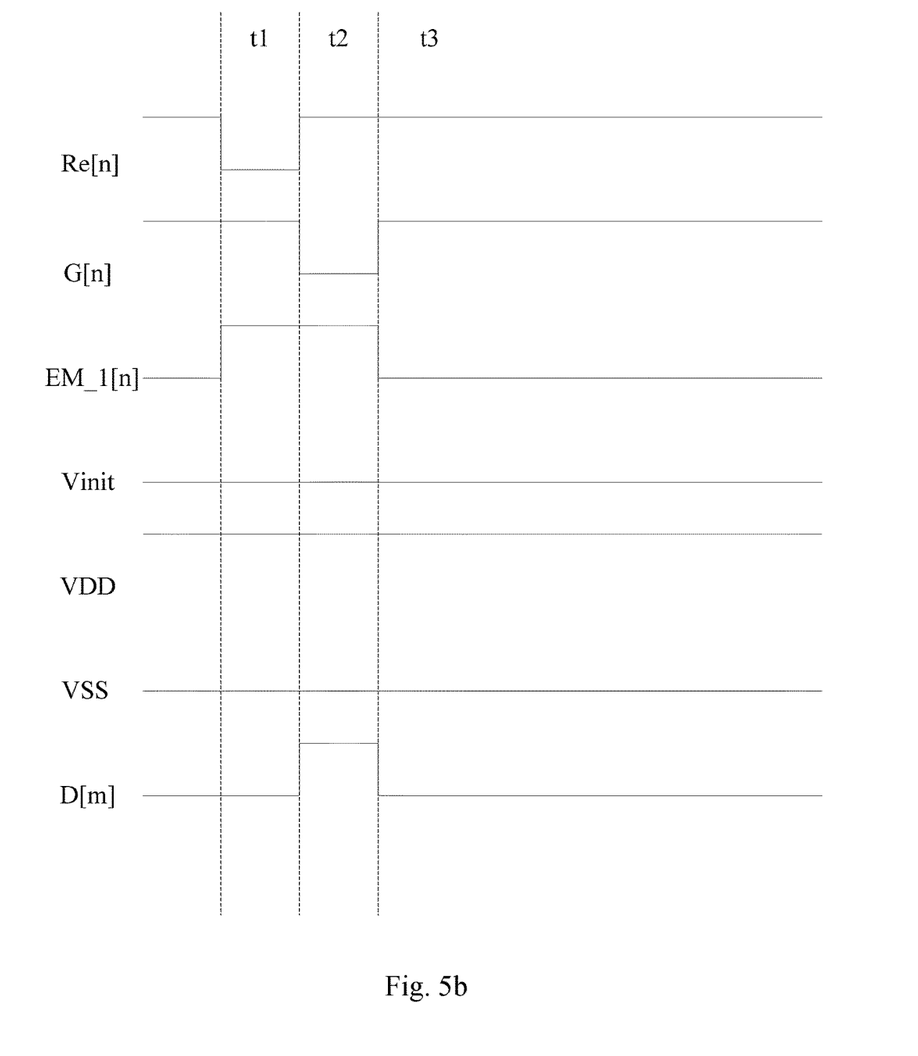

Operation of the light-emitting unit of FIG. 5a will be described below in conjunction with the time sequence diagram of FIG. 5b.

In a reset phase t1, the reset scan line Re[n] is at a low level, the gate scan line G[n] is at a high level, and the first secondary light-emitting control line EM_1[n] is at a high level. Hence, the fourth transistor T4 is turned on and other transistors are turned off. The voltage at the first node P1 is initialized to the reset voltage Vinit (e.g., a low level).

In a data write phase t2, the reset scan line Re[n] is at a high level, the gate scan line G[n] is at a low level, and the first secondary light-emitting control line EM_1[n] is at a high level. Hence, the fifth transistor T5 and the sixth transistor T6 are turned on, and the fourth transistor T4, the seventh transistor T7 and the eighth transistor T8 are turned off. Since the voltage at the first node P1 is previously initialized to the reset voltage Vinit at a low level, the driving transistor D is turned on. The data signal Vdata on the data line D[m] passes, in turn, through the sixth transistor T6, the driving transistor D and the fifth transistor T5 to charge the first node P1 until the voltage at the first node P1 is charged to Vdata−|Vth| (namely, a voltage difference between the gate and source of the driving transistor D is |Vth|). This process may be referred to as threshold voltage compensation of the driving transistor D. With the voltage at the right terminal of the storage capacitor C being held at the first power supply voltage VDD, the voltage at the first node P1 remains at Vdata−|Vth| after the completion of the charging.

In a light-emitting phase t3, the reset scan line Re[n] and the gate scan line G[n] are at a high level, and the first secondary light-emitting control line EM_1[n] is at a low level. The fourth transistor T4, the fifth transistor T5 and the sixth transistor T6 are turned off, and the seventh transistor T7 and eighth transistor T8 are turned on. The source of the driving transistor D is connected to the first power supply voltage VDD, and the gate of the driving transistor D is at the voltage Vdata−|Vth|, so that the driving transistor D generates a driving current $I_{OLED}$. The driving current $I_{OLED}$ passes in turn through the seventh transistor T7, the driving transistor D, the eighth transistor T8 and the light-emitting device OLED.

The following equation may be derived from the formula for saturated current of the driving transistor D.

$$I_{OLED} = K(V_{GS} - Vth)^2$$
$$= K[(Vdata - |Vth|) - VDD - Vth]^2$$
$$= K(Vdata - VDD)^2$$

where K represents a constant related to a mobility and a parasitic capacitance of the driving transistor D, $V_{GS}$ represents a voltage difference between the gate and source of the driving transistor D, and Vth represents a threshold voltage of the driving transistor D.

It can be seen that the driving current $I_{OLED}$ is irrelevant to the threshold voltage Vth of the driving transistor D. This may eliminate an influence exerted by drift of the threshold voltage on the light-emitting brightness of the light-emitting device.

In some embodiments, the switching transistors and the driving transistor may be Thin Film Transistors (TFTs). Alternatively, they may also be Metal Oxide Semiconductor Field Effect Transistors (MOSFETs). Usually, these transistors are fabricated with interchangeable sources and drains.

Referring back to FIG. 1, the first scan driving unit 102, the second scan driving unit 104 and the data driving unit 106 in the backlight module 100 may be implemented with for example known scanning circuits and data drivers that are employed in an OLED display panel. As known, the first scan driving unit 102 and second scan driving unit 104 may each comprise a plurality of shift register units which are cascaded with one another, wherein each shift register unit generates a scan signal. In order not to obscure the subject matter of the present disclosure, detailed description of the first scan driving unit 102, the second scan driving unit 104 and the data driving unit 106 are omitted here.

Figure 6:
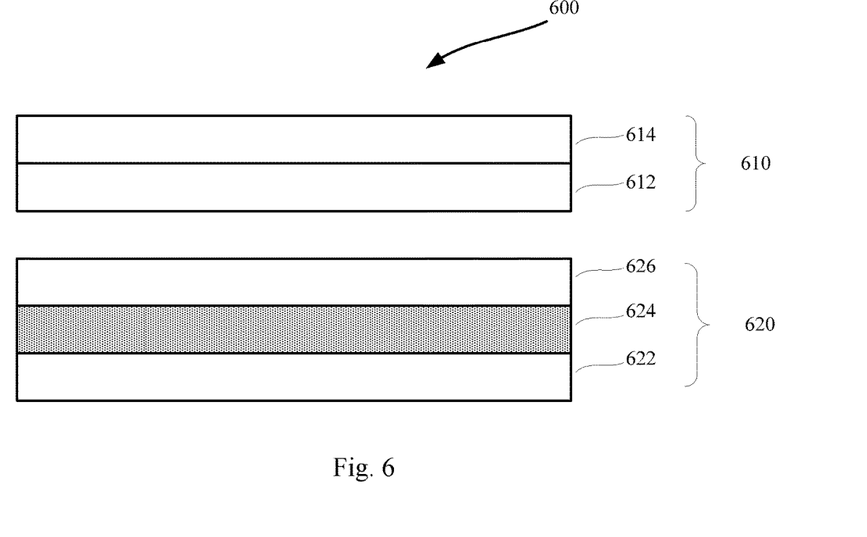
FIG. 6 is a schematic sectional view of a display device according to an embodiment of the present disclosure.

FIG. 6 is a schematic sectional view of a display device 600 according to an embodiment of the present disclosure. Referring to FIG. 6, the display device 600 comprises a display panel 610 and a backlight module 620 which provides backlight for the display panel 610. The backlight module 620 may be identical with the backlight module 100 as shown in FIG. 1.

The liquid crystal display panel 610 comprises a lower substrate 612, an upper substrate 614, a lower polarizer (not shown), an upper polarizer (not shown) and a liquid crystal layer (not shown). The backlight module 620 comprises an array substrate 622, an organic electroluminescence structure 624 and an encapsulation cover plate 626. The layered structure is known in the art, and therefore will not be described in detail herein.

In the backlight module 620, the light-emitting phase of each row of light-emitting devices is divided into three time periods (referred to as "fields"). In the time period of the first field, the liquid crystal display panel 610 is controlled such that the liquid crystal molecules reach corresponding deflection angles, and the first light-emitting devices in the backlight module 620 are driven to provide red backlight. In the time period of the second field, the liquid crystal display panel 610 is controlled such that the liquid crystal molecules reach corresponding deflection angles, and the second light-emitting devices in the backlight module 620 are driven to provide green backlight. In the time period of the third field, the liquid crystal display panel 610 is controlled such that the liquid crystal molecules reach corresponding deflection angles, and the third light-emitting devices in the backlight module 620 are driven to provide blue backlight. In a predetermined scan time sequence, the three fields of different colors are switched so that they are perceived by human eyes as colored images. As such, a field sequential color liquid crystal display device may be implemented that has a backlight source based on the organic light-emitting devices.

Such a backlight module allows for fine adjustment of the backlight brightness at a designated position on the display panel. This may be done by changing the data signals provided to respective light-emitting units because the data signals provided to respective light-emitting units are individually controllable. In addition, since the backlight module 620 may provide colored backlight, the liquid crystal display panel 610 may not have a color filter layer. In this way, the thickness of the resultant display device may be reduced, and the light transmittance thereof may be increased.

Figure 7:
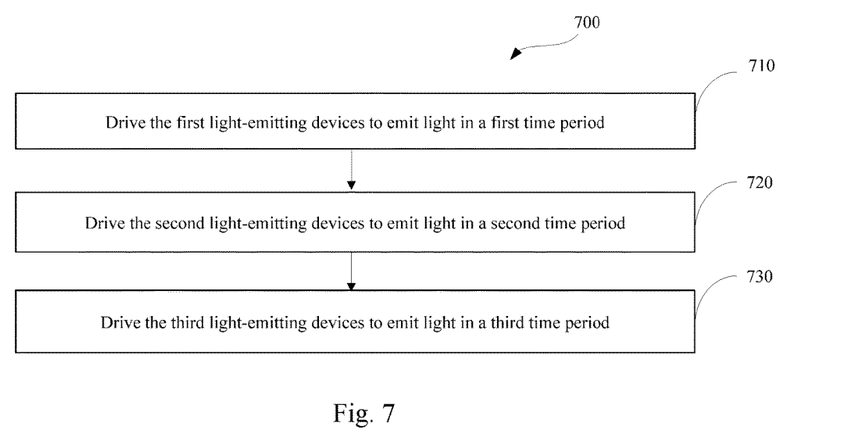
FIG. 7 is a flow chart of a method of driving a backlight module according to an embodiment of the present disclosure.

FIG. 7 is a flow chart of a method 700 of driving a backlight module according to an embodiment of the present disclosure. The backlight module may be the backlight module 100 as described in the above embodiments. Referring to FIG. 7, the method 700 comprises the following steps.

At step 710, the plurality of first light-emitting devices in each row of light-emitting devices are driven to emit light within a first time period of a respective light-emitting phase for each row of the light-emitting devices. This may be done by applying via the plurality of light-emitting control modules a respective light-emitting control signal to the driving modules for driving the plurality of first light-emitting devices in each row of light-emitting devices.

At step 720, the plurality of second light-emitting devices in each row of light-emitting devices are driven to emit light within a second time period of the respective light-emitting phase for each row of the light-emitting devices. This may be done by applying via the plurality of light-emitting control modules a respective light-emitting control signal to the driving modules for driving the plurality of second light-emitting devices in each row of light-emitting devices.

At step 730, the plurality of third light-emitting devices in each row of light-emitting devices are driven to emit light within a third time period of the respective light-emitting phase for each row of the light-emitting devices. This may be done by applying via the plurality of light-emitting control modules a respective light-emitting control signal to the driving modules for driving the plurality of third light-emitting devices in each row of light-emitting devices.

Although the backlight module in the above embodiments is described as providing backlight in the sequence of red, green and blue, this is not necessary. In other embodiments, the backlight module may provide backlight of different colors in other sequences.

Various modifications and variations may be made to the present disclosure by those skilled in the art without departing from the spirit and scope of the present disclosure. Thus, if these modifications and variations fall within the scope of the appended claims and the equivalents thereof, the present disclosure is intended to encompass these modifications and variations.

What is claimed is:

1. A backlight module, comprising: an array of multiple rows and multiple columns, each row comprising a plurality of first light-emitting diodes for emitting red light, a plurality of second light-emitting diodes for emitting green light and a plurality of third light-emitting diodes for emitting blue light; a plurality of driving circuits each configured to drive a respective one of the plurality of first, second, or third light-emitting diodes to emit light based on a respective data signal; a plurality of light-emitting control circuits each associated with respective ones of the driving circuits for driving a respective row of the light-emitting diodes and configured to control the respective driving circuits to drive the first light-emitting diodes, the second light-emitting diodes and the third light-emitting diodes in the respective row of the light-emitting diodes to emit light sequentially based on respective data signals in a light-emitting phase; a first scan driving circuit configured to provide scan signals to scan lines, each of the scan lines being connected to respective ones of the driving circuits for driving a respective row of the light-emitting diodes; a second scan driving circuit configured to provide respective light-emitting control signals to the plurality of light-emitting control circuits; and a data driver configured to provide data signals to data lines, each of the data lines being connected to respective ones of the driving circuits for driving a respective column of the light-emitting diodes, wherein each of the light-emitting control circuits comprises: a first switching transistor having a first gate connected with a first control signal line, a first source connected with a primary light-emitting control line, and a first drain connected with a first secondary light-emitting control line, the primary light-emitting control line being directly connected to the second scan driving circuit to receive a respective one of the light-emitting control signals, the first secondary light-emitting control line being directly connected to the driving circuits for driving the first light-emitting diodes in the respective row of the light-emitting diodes; a second switching transistor having a second gate connected with a second control signal line, a second source connected with the primary light-emitting control line, and a second drain connected with the second secondary light-emitting control line, the second secondary light-emitting control line being directly connected to the driving circuits for driving the second light-emitting diodes in the respective row of the light-emitting diodes; and a third switching transistor having a third gate connected with a third control signal line, a third source connected with the primary light-emitting control line, and a third drain connected with a third secondary light-emitting control line, the third secondary light-emitting control line being directly connected to the driving circuits for driving the third light-emitting diodes in the respective row of the light-emitting diodes, and wherein the first switching transistor, the second switching transistor and the third switching transistor are configured to, in response to control signals from the first control signal line, the second control signal line and the third control signal line, to alternatingly and sequentially apply the light-emitting control signal received by the primary light-emitting control line from the second scan driving circuit to the driving circuit directly connected to the first secondary light-emitting control line, the driving circuit directly connected to the second secondary light-emitting control line, and the driving circuit directly connected to the third secondary light-emitting control line.

2. The backlight module according to claim 1, wherein the first switching transistor, the second switching transistor and the third switching transistor are configured to, in response to the control signals from the first control signal line, the second control signal line and third control signal line, turn off in a time period other than the light-emitting phase.

3. The backlight module according to claim 1, wherein each of the driving circuits comprises a resetting circuit, a charging circuit, a compensating circuit a maintaining circuit, a power supply input circuit a driving sub-circuit, and a controlling circuit, wherein:

each resetting circuit is configured to, in response to a reset scan signal from a reset scan line, initialize a voltage at a first node to a reset voltage;

each charging circuit is configured to, in response to a gate scan signal from a gate scan line, transfer a data signal from a data line to a second node, the data signal being further transferred to a third node via the driving sub-circuit;

each compensating circuit is configured to, in response to the gate scan signal from the gate scan line, provide a conduction path from the third node to the first node such that the data signal charges the first node;

each maintaining circuit is configured to maintain a charged voltage derived from the charging of the first node by the data signal;

each power supply input circuit is configured to, in response to the light-emitting control signal from one of the first secondary light-emitting control line, the second secondary light-emitting control line and the third secondary light-emitting control line, provide a power supply voltage for the driving sub-circuit;

each driving circuit is configured to, in response to the charged voltage at the first node and the power supply voltage, provide a driving current flowing from the second node to the third node; and each controlling circuit is configured to, in response to the light-emitting control signal from one of the first secondary light-emitting control line, the second secondary light-emitting control line and the third secondary light-emitting control line, direct the driving current to the respective light-emitting diode.

4. The backlight module according to claim 3, wherein each driving sub-circuit comprises:
a driving transistor having a gate connected with the first node, a source connected with the second node, and a drain connected with the third node.

5. The backlight module according to claim 3, wherein each resetting circuit comprises:
a fourth switching transistor having a gate connected with the reset scan line, a source connected with the reset voltage, and a drain connected with the first node.

6. The backlight module according to claim 3, wherein each compensating circuit comprises:
a fifth switching transistor having a gate connected with the gate scan line, a source connected with the first node, and a drain connected with the third node.

7. The backlight module according to claim 3, wherein each charging circuit comprises:
a sixth switching transistor having a gate connected with the gate scan line, a source connected with the data line, and a drain connected with the second node.

8. The backlight module according to claim 3, wherein each maintaining circuit comprises:
a storage capacitor having a terminal connected to the first node and another terminal connected to the power supply voltage.

9. The backlight module according to claim 3, wherein each power supply input circuit comprises:
a seventh switching transistor having a gate connected with one of the first secondary light-emitting control line, the second secondary light-emitting control line and the third secondary light-emitting control line, a source connected with the power supply voltage, and a drain connected with the second node.

10. The backlight module according to claim 3, wherein each controlling circuit comprises:
an eighth switching transistor having a gate connected with one of the first secondary light-emitting control line, the second secondary light-emitting control line and the third secondary light-emitting control line, a source connected with the third node, and a drain connected with the respective light-emitting diode.

11. The backlight module according to claim 1, wherein the plurality of light-emitting diodes are organic light-emitting diodes.

12. A display device, comprising:
a liquid crystal display panel; and
the backlight module according to claim 1 for providing backlight for the liquid crystal display panel.

13. A method of driving a backlight module according comprising:
driving a plurality of first light-emitting diodes in each row of the light-emitting diodes to emit light within a first time period of a respective light-emitting phase for each row of the light-emitting diodes;

driving a plurality of second light-emitting diodes in each row of the light-emitting diodes to emit light within a second time period of the respective light-emitting phase for each row of the light-emitting diodes; and driving a plurality of third light-emitting diodes in each row of the light-emitting diodes to emit light within a third time period of the respective light-emitting phase for each row of the light-emitting diodes;

wherein the backlight module comprises
an array of multiple rows and multiple columns, each row comprising the plurality of first light-emitting diodes for emitting red light, the plurality of second light-emitting diodes for emitting green light and the plurality of third light-emitting diodes for emitting blue light;

a plurality of driving circuits each configured to drive a respective one of the plurality of first, second, or third light-emitting diodes to emit light based on a respective data signal;

a plurality of light-emitting control circuits each associated with respective ones of the driving circuits for driving a respective row of the light-emitting diodes and configured to control the respective driving circuits to drive the first light-emitting diodes, the second light-emitting diodes and the third light-emitting diodes in the respective row of the light-emitting diodes to emit light sequentially based on respective data signals in a light-emitting phase;

a first scan driving circuit configured to provide scan signals to scan lines, each of the scan lines being connected to respective ones of the driving circuits for driving a respective row of the light-emitting diodes;

a second scan driving circuit configured to provide respective light-emitting control signals to the plurality of light-emitting control circuits; and a data driving circuit configured to provide data signals to data lines, each of the data lines being connected to respective ones of the driving circuits for driving a respective column of the light-emitting diodes, wherein each of the light-emitting control circuits comprises
a first switching transistor having a first gate connected with a first control signal line, a first source connected with a primary light-emitting control line, and a first drain connected with a first secondary light-emitting control line, the primary light-emitting control line being directly connected to the second scan driving circuit to receive a respective one of the light-emitting control signals, the first secondary light-emitting control line being directly connected to the driving circuits for driving the first light-emitting diodes in the respective row of the light-emitting diodes;

a second switching transistor having a second gate connected with a second control signal line, a second source connected with the primary light-emitting control line, and a second drain connected with the second secondary light-emitting control line, the second secondary light-emitting control line being directly connected to the driving circuits for driving the second light-emitting diodes in the respective row of the light-emitting diodes; and a third switching transistor having a third gate connected with a third control signal line, a third source connected with the primary light-emitting control line, and a third drain connected with a third secondary light-emitting control line, the third secondary light-emitting control line being directly connected to the driving circuits for driving the third light-emitting diodes in the respective row of the light-emitting diodes, and wherein the first switching transistor, the second switching transistor and the third switching transistor are configured to, in response to control signals from the first control signal line, the second control signal line and the third control signal line, to alternatingly and sequentially apply the light-emitting control signal received by the primary light-emitting control line from the second scan driving circuit to the driving circuit directly connected to the first secondary light-emitting control line, the driving circuit directly connected to the second secondary light-emitting control line, and the driving circuit directly connected to the third secondary light-emitting control line.

* * * * *